United States Patent

Diedrich et al.

[15] 3,676,414

[45] July 11, 1972

[54] PROCESS FOR POLYMERIZING α-OLEFINS

[72] Inventors: Bernd Diedrich; Karl Diether Keil; Kurt Rust, all of Frankfurt/Main, Germany

[73] Assignee: Farbwerke Hoechst Aktiengesellschaft vormals Meister Lucius & Bruning, Frankfurt/Main, Germany

[22] Filed: June 25, 1969

[21] Appl. No.: 836,571

[30] Foreign Application Priority Data

June 27, 1968 Germany .....................P 17 70 718.5
June 27, 1968 Germany .....................P 17 70 727.6

[52] U.S. Cl. ...................260/88.2, 252/429 C, 260/94.9 DA
[51] Int. Cl. .........................................C08f 1/56, C08f 3/06
[58] Field of Search ....................260/88.2, 94.9 E, 94.9 DA

[56] References Cited

UNITED STATES PATENTS

| | | | |
|---|---|---|---|
| 2,981,725 | 4/1961 | Luft et al. | 260/94.9 |
| 3,166,542 | 1/1965 | Orzechowski et al. | 260/94.9 |
| 3,232,913 | 2/1966 | Van Weynbergh et al. | 260/94.9 |
| 3,400,110 | 9/1968 | Dassesse et al. | 260/88.2 |

FOREIGN PATENTS OR APPLICATIONS

| | | |
|---|---|---|
| 6,714,024 | 4/1968 | Netherlands |
| 1,560,467 | 2/1969 | France |

*Primary Examiner*—Joseph L. Schofer
*Assistant Examiner*—Edward J. Smith
*Attorney*—Connolly and Hutz

[57] ABSTRACT

The invention provides a process for homopolymerizing or copolymerizing ethylene in the presence of mixed catalysts comprising as component A the reaction products of specific tetravalent titanium compounds with chlorine-containing magnesium compounds containing at least 1.5 moles of OH groups per gram-atom of magnesium and as component B an organo-aluminum compound. Under a pressure below 20 atmospheres the yields are so high per unit of catalyst that the residues thereof need not be removed from the polymer. It is possible to produce polymers having a very narrow distribution of molecular weight and very good color and corrosion values.

8 Claims, No Drawings

PROCESS FOR POLYMERIZING α-OLEFINS

It is known to polymerize α-olefins and mixtures thereof by the Ziegler low pressure polymerization process. The catalysts used in this process are mixtures of compounds of the elements of sub-groups IV to VI of the Periodic Table according to Mendeleeff and organo-metal compounds of the elements of groups I to III of the Periodic Table. In general, the polymerization is carried out in suspension, in solution, or in the gaseous phase.

Processes have been proposed in which the catalyst components are used in combination with a carrier material. According to the process disclosed in French Pat. No. 1,198,422 the compounds of sub-groups IV to VI of the Periodic Table are mixed with carrier materials such as bentonite, pumice, kieselguhr, calcium phosphate or silica gel, and then reduced with organo-aluminum compounds. In this process the polymerization takes place independent of the type of carrier material used, only the composition of the catalyst fixed on the carrier material is of importance. A disadvantage of this method is, above all, the necessity to remove the catalyst and the carrier material before the polymers are further processed.

In other patent specifications it has been stated that a specific composition and nature of the carrier material is necessary to obtain a sufficient activity of the catalyst. In Belgian Pat. No. 609,261, for example, alkali earth metal phosphates are used which, prior to being reacted with titanium or vanadium compounds, must be heated at 200° to 1,000° C to obtain an activity that is sufficient for polymerization. In spite of this procedure the yield of polymer is very low. In Belgian Pat. No. 650,679 and French Pat. No. 1,448,320 hydroxychlorides of bivalent metals of the general formula Me(OH)Cl, preferably Mg(OH)Cl, are used as carrier materials for Ziegler catalysts. It is said that when the carrier is reacted with the transition metal component a chemical reaction takes place, for example according to the following equation:

$$Cl-Mg-OH + TiCl_4 \rightarrow ClMg-O-TiCl_3 + HCl$$

Higher polymer yields can only be obtained when the polymerization is carried out under a pressure of about 20 atmospheres gauge. The process has the disadvantages that the preferably used Mg(OH)Cl must be prepared in rather complicated manner by very cautious stepwise dehydration of $MgCl_2 \cdot 6 H_2O$ at 285° C and that the carrier material used has a relatively high chlorine content.

In German Pat. No. 1,214,653 a process for the manufacture of catalysts supported on a carrier has been proposed according to which specific heavy metal compounds of the metals of groups IVa, Va, VIa, VIIa, and VIII of the Periodic Table are allowed to act on pyrogenic metal oxides or non-metal oxides, preferably pyrogenic alumina, pyrogenic titanium dioxide or pyrogenic silica, which have the function of a carrier and the surfaces of which contain hydroxyl groups. The mean particle size of the carrier material should be less than about 0.1 micron and the concentration of hydroxyl groups should be so high that the hydroxyl groups react with at least $1 \times 10^{-4}$ equivalent of the transition metal per gram of carrier material.

Even if carried out under a pressure of 190 atmospheres gauge the polymerization gives such a low yield that a subsequent removal of catalyst and carrier material from the polymer is indispensable when an industrially useful product shall be produced.

Polymerizations according to the Ziegler process with catalysts supported on carriers can only be performed in economic manner when the polymer can be further processed without removal of catalyst and carrier. This is only possible if high polymer yields are obtained per catalyst unit and the polymer does not contain too high a proportion of chlorine which would involve coloration of the polymer and corrosion of the processing machines.

The present invention provides a process for polymerizing ethylene or mixtures of ethylene with up to 10 % by weight, preferably up to 5 % by weight, of α-olefins of the general formula $R-CH=CH_2$, in which R stands for a branched or straight-chain hydrocarbon radical having one to 13 carbon atoms, preferably one to eight carbon atoms, in solution, in suspension or in the gaseous phase at a temperature in the range of from 20° to 120° C, preferably 60° to 100° C, under a pressure of up to 20 atmospheres, preferably 1.5 to 8 atmospheres, in the presence of a mixed catalyst consisting of the reaction product of a titanium compound with an inorganic solid (component A) and an organo-aluminum compound (component B), optionally with regulation of the molecular weight by means of hydrogen, which comprises carrying out the polymerization in the presence of a mixed catalyst component A of which has been obtained by reacting tetravalent titanium compounds containing halogen atoms and alkoxy or aralkoxy groups with halogen-containing magnesium compounds which contain at least 1.5 mols of hydroxyl groups per gram-atom of magnesium.

It is very surprising and could not be expected that the reaction products of the magnesium compounds with the titanium compounds used according to the invention represent highly active catalysts, the more so as in Belgian Pat. No. 650,679 it has expressly been stated that active catalysts cannot be obtained when instead of Me(OH)Cl as carrier other bivalent metal compounds containing hydroxyl groups are used. Quite contrary thereto, the catalysts used according to the invention are considerably more active than catalysts with Mg(OH)Cl.

Component A of the catalyst used in the process of the invention is a reaction product of specific magnesium compounds with tetravalent titanium compounds containing halogen atoms and alkoxy groups or aralkoxy groups. For polymerization the unreacted magnesium compound is not removed from the reaction product. By the reaction of the hydroxyl groups of the magnesium compound with the titanium compounds used according to the invention the two compounds are firmly linked with one another and their structure changes. The process of the invention is, therefore, very different from processes using catalysts which are simply deposited on the carrier material or with which the carrier material is impregnated, as in neither case the chemical structure of the catalysts is changed by the carrier material.

Suitable tetravalent titanium compounds containing halogen atoms and alkoxy or aralkoxy groups are halo-titanic acid esters, preferably halo-ortho-titanic acid esters of the general formula $TiX_n(OR)_{4-n}$ in which $n$ is 1 to 3, X stands for chlorine and bromine and R represents identical or different hydrocarbon radicals, preferably alkyl radicals having one to 18, advantageously one to 10 carbon atoms. Especially good results are obtained with alkoxy titanates of the indicated formula in which $n$ is 1 to 2 and R stands for identical or different alkyl radicals having two to eight carbon atoms. There are mentioned by way of example $Ti(OC_2H_5)_2Cl_2$, $Ti(OC_2H_5)_3Cl$, $Ti(OC_3H_7)_2Cl_2$, $Ti(O\text{-}isoC_3H_7)_2Cl_2$, $Ti(OC_3H_7)_3Cl$, $Ti(O\text{-}isoC_3H_7)_3Cl$, $Ti(O\text{-}isoC_4H_9)_2Cl_2$, $Ti(O\text{-}isoC_4H_9)_3Cl$.

In some cases it is advantageous to prepare the halo-ortho-titanic acid ester of the above formula in situ by reacting the corresponding ortho-titanic acid ester with $TiCl_4$ in appropriate proportions.

The reaction is preferably carried out at a temperature in the range of from 0° to 200° C, the upper temperature limit being given by the temperature of decomposition of the titanium compound used. Temperatures of from 20° to 120° C are preferred.

The reaction may be carried out in inert diluents, for example aliphatic or cycloaliphatic hydrocarbons as generally used in low pressure polymerization such as butane, pentane, hexane, heptane, cyclohexane, methylcyclohexane, as well as aromatic hydrocarbons such as benzene or xylene. It is likewise possible to use fractions of hydrogenated Diesel oil which have been carefully freed from oxygen, sulfur compounds and moisture.

When the reaction is terminated the reaction product of the magnesium compound and the titanium compound which is insoluble in hydrocarbons is freed from unreacted titanium compound by repeatedly washing with one of the diluents specified above in which the titanium compound is readily soluble.

Suitable halogen-containing magnesium compounds containing at least 1.5 moles of hydroxyl groups per gram-atom of magnesium are compounds of the general formula $MgCl_2 \cdot XMg(OH)_2$ in which X is equal to or greater than 3 or magnesium oxychloride cement (Sorel cement), which are prepared in known manner.

The former compounds are obtained by reacting magnesium chloride with magnesium hydroxide, if desired with subsequent substantial dehydration. It is possible, for example to heat at a temperature of from 180° to 250° C, preferably 200° to 240° C, a mixture of $MgCl_2 \cdot 6\ H_2O$ and $Mg(OH)_2$ in a molar ratio of at least 1:3. It is expedient to perform heating in stages, by first heating the mixture at 100° to 140° C, preferably a temperature slightly above the melting point of $MgCl_2 \cdot 6\ H_2O$, finely grinding the reaction product obtained and then substantially dehydrating it at a temperature of from 180° to 250° C, preferably 200° to 240° C. When heating is performed in one stage the rapidly escaping water may involve losses due to splashing.

Alternatively, the magnesium compounds used may be prepared by reacting an aqueous magnesium chloride solution with magnesium hydroxide in a molar ratio of at least 1:3 at a temperature of from 20° to 100° C, concentrating the suspension, for example on the water bath, and then substantially dehydrating the reaction product, preferably in stages by first heating at 100° to 120° C, finely grinding the product obtained and then heating it at 180° to 250° C, advantageously 200° to 240° C.

The carrier materials obtained in this manner may still contain a small amount of crystal water. Above the value of 3 the molar ratio of $Mg(OH)_2$ to $MgCl_2$ may vary within wide limits, a ratio of 3 to 10 and more particularly 3 to 5 being preferred. With a molar ratio smaller than 3 a considerable loss of activity is observed.

The magnesium oxychloride cements can be prepared by reacting an aqueous, about 3 to 5 normal solution of $MgCl_2$ with magnesium oxide in a molar ratio of 1:3 to 1:8, preferably 1:3 to 1:5. The initially plastic mixture solidifies after a short period of time to a hard white mass, which is substantially dehydrated, advantageously by heating in stages, first at 100° to 120° C, and after grinding at 180° to 300° C, preferably 190° to 250° C.

The magnesium compounds used have preferably an average particle size of 0.1 to 150 microns, more preferably 1 to 100 microns.

Component A of the catalyst preferably contains 0.05 to 10 mg-atom and more preferably 1 to 10 mg-atom of titanium per gram of component A. The titanium content can be varied by the time of reaction, the temperature of reaction and the concentration of the titanium compound used.

The concentration of the titanium component fixed on the magnesium compound is advantageously within the range of from 0.005 to 1.5, preferably from 0.03 to 0.8 mmols, per liter of dispersing agent or reactor volume. Generally, even higher concentrations are possible.

Prior to being reacted with the titanium compound the magnesium compounds of the specified general formula may be reacted with other inert inorganic solids that do not inhibit the polymerization. Solids of this tape are metal compounds such as oxides, hydroxides, halides, sulfates, carbonates, phosphates, silicates, more particularly alkaline earth metal oxides, for example CaO, $Al(OH)_3$, fluorides and chlorides, for example $MgF_2$, $AlCl_3$, $ZnCl_2$, $NiCl_2$, alkaline earth metal carbonates such as $BaCO_3$, alkaline earth metal phosphates, for example $Ca_3(PO_4)_2$, apatite, or talc.

The molar ratio of magnesium compound to inorganic solid may vary within wide limits, a range of from 1:0.05 to 1:0.9 and more particularly 1:0.08 to 1:0.5 being preferred.

When, for example $ZnCl_2$ is added to the magnesium compound, a catalyst is obtained which has a distinctly improved reactivity with respect to $H_2$ and is, therefore, suitable for the manufacture of polymers having low molecular weights.

The tetravalent titanium compound in component A is suitably transformed into the polymerization-active compound having a lower valence during the course of polymerization by adding the organo-aluminum compound (component B) at a temperature of from 20° to 120° C, preferably 60° to 100° C.

It is likewise possible, however, to treat component A with the organo-aluminum compound prior to polymerization at a temperature of from −30° to 100° C, preferably 0° to 20° C. When chlorine-containing organo-aluminum compounds are used, it is advantageous, however, to wash the reaction product obtained. It is then activated with the organo-aluminum compound at a temperature of from 20° to 120° C, preferably 60° to 100° C.

Suitable organo-aluminum compounds are the reaction products of aluminum trialkyls or dialkyl aluminum hydrides with hydrocarbon radicals having one to 16 carbon atoms, preferably $Al(isobutyl)_3$ or $Al(isobutyl)_2H$ and diolefins containing four to 20 carbon atoms, preferably isoprene, for example aluminum isoprenyl.

As component B there may also be used chlorine-containing organo-aluminum compounds, for example dialkyl-aluminum monochlorides of the formula $R_2AlCl$ or alkyl-aluminum sesquichlorides of the formula $R_3Al_2Cl_3$ in which R stands for identical or different hydrocarbon radicals, preferably alkyl radicals having one to 16, advantageously two to 12 carbon atoms, for example $(C_2H_5)_2AlCl$, $(isoC_4H_9)_2AlCl$ or $(C_2H_5)_3Al_2Cl_3$.

As component B there are preferably used aluminum trialkyls of the formula $AlR_3$ or dialkyl aluminum hydrides of the formula $AlR_2H$ in which R stands for identical or different hydrocarbon radicals, preferably alkyl radicals having one to 16 and advantageously two to six carbon atoms, such as $Al(C_2H_5)_3$, $Al(C_2H_5)_2H$, $Al(C_3H_7)_3$, $Al(C_3H_7)_2H$, $Al(isoC_4H_9)_3$ or $Al(isoC_4H_9)_2H$.

The organo-aluminum activator can be used in a concentration of from 0.5 to 10 millimoles, preferably 2 to 4 millimoles per liter of dispersion medium, or per liter of reactor volume.

The polymerization is carried out in solution, in suspension or in the gaseous phase either continuously or discontinuously at a temperature in the range of from 20° to 120° C, preferably 60° to 100° C under a pressure of up to 20 atmospheres, preferably 1.5 to 8 atmospheres.

The polymerization in suspension is carried out in the inert diluents generally used for Ziegler low pressure polymerizations as defined above for the preparation of component A of the catalyst.

Olefins that can be polymerized by the process of the invention are ethylene or mixtures of ethylene with up to 10 % by weight, preferably up to 5 % by weight of α-olefins of the general formula $R-CH = CH_2$ in which R stands for a branched or straight-chain hydrocarbon radical, preferably an alkyl radical, with one to 13 and preferably one to eight carbon atoms. Olefines of this type are preferably propylene, butene-(1), penetene-(1) and 4-methyl-penetene-(1).

The molecular weight of the polymers can be regulated in known manner by adding regulators, preferably hydrogen.

The important industrial progress of the process of the invention over the process of Belgian Pat. No. 650,679 and French Pat. No. 1,448,320 resides in the fact that the polymerization is more simple to carry out as high polymer yields are obtained per unit of catalyst in a pressure range of from 4 to 9 atmospheres so that the catalyst may remain in the polymer.

Hence, in the case of polymerization in suspension complicated operations may be dispensed with, such as decomposition of the catalyst, removal of the catalyst and carrier material and the like. After filtration to remove the dispersion medium the polymer is dried and directly further processed without additional treatment. The very low amounts of catalyst and carrier in the polymer do neither discolor the polymer nor corrode the processing machines.

As compared therewith, in the known processes considerably lower yields are obtained per gram of MgOHCl on which the TiCl$_4$ is fixed, even under a pressure of 20 atmospheres gauge, for example at most 1.5 kilograms of polymer per gram of MgOHCl, whereas the process of the invention yields under a pressure of 5 to 9 atmospheres 3 to 15 kilograms of polymer per gram of magnesium compound used, on which, for example Ti(O-isoC$_3$H$_7$)$_2$Cl$_2$, is fixed.

Moreover, the magnesium compounds of the invention contain a much lesser amount of chlorine than MgOHCl so that the polymers obtained by the process of the invention have much better corrosion values with the same content of carrier material.

With the preferred use of chloroalkoxytitanates (IV) of the formula TiCl$_n$(OR)$_{4-n}$ in which $n$ is 1 to 2 and R stands for identical or different alkyl radicals having two to eight carbon atoms, polymers are obtained with a very narrow distribution of the molecular weight and interesting utilitarian properties, the Mw/Mn values being in the range of from 2 to 6.

The polymers obtained by the process of the invention have excellent color values and corrosion properties and are especially suitable for the manufacture of injection moulded articles.

The following examples serve to illustrate the invention but they are not intended to limit it thereto.

EXAMPLE 1

I. Preparation of catalyst a. 162 Grams of MgCl$_2$.6 H$_2$O (melting point 106° C) were thoroughly mixed with 140 grams of Mg(OH)$_2$ and heated for 18 hours at 120° C. The reaction product was then finely ground and thermally treated for 30 hours at 220° C.

b. 100 Grams of the carrier material obtained were boiled for 7 hours with reflux in a nitrogen atmosphere and while stirring with 1,400 milliliters of 1 molar solution of TiCl$_2$(O-isoC$_3$H$_7$)$_2$ in cyclohexane. The precipitate was washed by decanting and stirring 15 times, each time with 500 milliliters of cyclohexane until the cyclohexane above the solid was free from unreacted titanium compound. The volume of the suspension was made up to 1,400 milliliters.

The titanium content of the suspension was determined colorimetrically with hydrogen peroxide (cf. G.O. Muller Praktikum der quantitativen chemischen Analyse, 4th edition (1957), page 243). 10 Milliliters of the suspension contained 1.6 millimoles of titanium compound.

II. Polymerization of ethylene a. 100 Liters of Diesel oil having a boiling range of from 140 to 200° C were introduced into a vessel having a capacity of 150 liters, the air in the vessel was replaced by pure nitrogen and the contents of the vessel were heated at 80° to 85° C. Next a solution of 54 grams (400 millimoles) of aluminum triethyl in 500 milliliters of Diesel oil and 140 milliliters of the catalyst suspension were added. Polymerization was carried out at a temperature of 85° C. 6 Kilograms of ethylene were introduced per hour and an amount of hydrogen such that the gaseous phase contained 30 % by volume thereof. During the course of polymerization the pressure rose to about 7 atmospheres. After 7 hours the polyethylene formed was separated from the dispersion medium by filtration and dried. 42 Kilograms of polyethylene were obtained having a reduced specific viscosity of 2.1, determined with a 0.1 % solution in decahydronaphthalene at 135° C. The yield was about 4.5 kilograms of polyethylene for each gram of magnesium compound used. A polyethylene was obtained having a very narrow molecular weight distribution (Mw/Mn = 3.8). The value of molecular weight (weight average)/molecular weight (number average) was determined by the fractionation data of the gel permeation chromatograph of Messrs. Waters (U.S.A.) in 1,2,4-trichlorobenzene as solvent and elugtion agent at 130° C.

The polymer had excellent color values and corrosion properties and could be well processed by injection moulding.

b. Comparative experiment

Under the conditions indicated sub Ib a catalyst was prepared from 100 grams of MgOHCl (prepared as described in French Pat. No. 1,448,320) and 1,400 milliliters of a 1 molar solution of TiCl$_2$(O-isoC$_3$H$_7$)$_2$ in cyclohexane. With 140 milliliters of the suspension of the catalyst polyethylene was produced under the conditions indicated sub IIa. Under a polymerization pressure of 7 atmospheres only 28 kilograms of polyethylene were obtained after 7 hours.

EXAMPLE 2

Copolymerization of ethylene with butene

100 Liters of Diesel oil having a boiling point of from 140° to 200° C were introduced into a 150 liter vessel, the air in the vessel was replaced by pure nitrogen and the contents of the vessel were heated at 80° to 85° C. A solution of 79.2 grams (400 millimoles) of aluminum triisobutyl in 500 milliliters of Diesel oil and 120 milliliters of the catalyst suspension of Example 1, Ib were added. The polymerization was carried out at 85° C. 6 Kilograms of ethylene and 180 grams of butene-(1) were introduced per hour together with hydrogen in an amount such that the gaseous phase contained 20 % by volume thereof. During the course of polymerization the pressure rose to about 7 atmospheres. After 7 hours the ethylene-butene copolymer was separated from the dispersion medium by filtration and dried. About 43 kilograms of an ethylene-butene copolymer having a reduced specific viscosity of 2.8, determined with a 0.1 % solution in decahydronaphthalene at 135° C and a density of 0.932 g/cc were obtained. The polymer had excellent color and corrosion values. 5 Kilograms of copolymer were obtained for each gram of magnesium compound used.

EXAMPLE 3

I. Preparation of catalyst a. 162 Grams of MgCl$_2$.6 H$_2$O were dissolved in 300 milliliters of water and stirred in portions with 170 grams of Mg(OH)$_2$. The reaction product was evaporated to dryness on the water bath, dried at 100° C in a drying cabinet and finely ground. Next, the ground reaction product was thermally treated for 30 hours at 230° C.

b. 100 Grams of the magnesium compound obtained was boiled for 12 hours with reflux in a nitrogen atmosphere and while stirring with 1,500 milliliters of a 1 molar solution of TiCl$_2$(O-isoC$_3$H$_7$)$_2$ in cyclohexane. The precipitate was then washed by decanting and stirring 10 times, each time with 500 milliliters of cyclohexane until the liquid above the solid was free from titanium compound. The volume of the suspension was made up to 1,500 milliliters and the titanium content was determined colorimetrically. 10 Milliliters of suspension contained 0.72 millimoles of titanium.

II. Copolymerization of ethylene with butene

100 Liters of Diesel oil boiling at a temperature in the range of from 140° to 200° C were introduced into a 150 liter vessel and the air in the vessel was replaced by pure nitrogen. The Diesel oil was heated at 80°–85° C and a solution of 79.2 grams (400 millimoles) aluminum-triisobutyl in 500 milliliters of Diesel oil and 100 ml of the catalyst suspension obtained were added. The polymerization was carried out at 85° C. 6 Kilograms of ethylene and 120 grams of butene-(1) were introduced per hour together with hydrogen in an amount such that the proportion thereof in the gaseous phase amounted to 10 % by volume. During the course of polymerization the pressure rose to 7 atmospheres. After 7 hours the ethylene/butene copolymer formed was separated from the dispersion medium by filteration and dried. About 42 kilograms of an ethylene/butene copolymer having a reduced specific viscosity of 3.6, determined with a 0.1 % solution in decahydronaphthalene at 135° C, and a density of 0.942 g/cc were obtained. The product had excellent color and corrosion values. The yield amounted to about 7 kilograms of copolymer per gram of magnesium compound used.

EXAMPLE 4 a. Reaction of the supported catalyst with ethylaluminum sesquichloride

With exclusion of air and moisture a solution of 50 millimoles of $Al_2(C_2H_5)_3Cl_3$ (12.4 grams) in 250 milliliters of Diesel oil were dropped at 0° C over a period of 2 hours into 100 milliliters of the catalyst suspension according to Example II and the mixture was further stirred for 2 hours at 20° C. A bluish black precipitate was formed which was washed 4 times, each time with 300 milliliters of Diesel oil. The volume of the suspension was made up to 100 milliliters.

b. Polymerization of ethylene/propylene 100 liters of Diesel oil having a boiling temperature in the range of from 140° to 200° C were introduced into a 150 liter vessel and the air in the vessel was replaced by pure nitrogen. The Diesel oil was heated at 80° to 85° C and a solution of 54 grams (400 millimoles) of aluminum triethyl in 500 milliliters of Diesel oil and 40 milliliters of the suspension of the reduced catalyst obtained as described above were added. Polymerization was carried out at 85° C. 6 Kilograms of ethylene and 150 grams of propylene were introduced per hour together with hydrogen in an amount such that the proportion thereof in the gaseous phase was 20 % by volume. During the course of polymerization the pressure rose to about 7 atmospheres.

After 7 hours the polymer was separated from the dispersion medium by filtration and dried. About 43 kilograms of an ethylene/propylene copolymer having a reduced specific viscosity of 3.4, determined with a 0.1 % solution in decahydronaphthalene at 135° C, and a density of 0.936 g/cc were obtained. The product had excellent color and corrosion values.

EXAMPLE 5

A horizontal reactor having a capacity of 10 liters, provided with stirrer, the stirring means of which scraped along the inner wall, was charged with 500 grams of polyethylene having a reduced specific viscosity of 3.5 and an apparent density of 450 grams/liter. The air in the reactor was removed by repeated evacuation and scavenging for several hours with a mixture of ethylene and hydrogen. The reactor was then heated at 83° C and 5.7 grams (50 millimoles) of $Al(C_2H_5)_3$ and 5 ml of the catalyst suspension of Example 1 were added.

400 Grams of ethylene were introduced per hour and hydrogen in an amount such that during polymerization the proportion thereof amounted to 5 % by volume. During the course of polymerization the pressure rose to about 9 atmospheres. Polymerization was interrupted after 12 hours. About 5.1 kilograms of polyethylene were obtained having a reduced specific viscosity of 5.5, determined with a 0.1 % solution in decahydronaphthalene at 135° C.

EXAMPLE 6

I. Preparation of catalyst a. 300 grams of $MgCl_2.6\ H_2O$ were dissolved in 500 milliliters of water and stirred in portions with 200 grams of MgO. The initially plastic mass solidified after several hours. The magnesium oxychloride cement formed (Sorel cement) was dried at 120° C and finely ground and the ground reaction product was thermally treated at 220° C.

b. 135 Grams of the magnesium oxychloride cement thus treated were boiled with reflux for 12 hours in a nitrogen atmosphere and while stirring with 1,000 milliliters of a 1 molar solution of $TiCl_2(O-isoC_3H_7)_2$ in cyclohexane. The precipitate was washed by decanting and stirring 10 times, each time with 500 milliliters of cyclohexane until the liquid above the solid was free from titanium compound. The volume of the suspension was made up to 1,000 milliliters and the titanium content was determined colorimetrically with hydrogen peroxide. 5 Milliliters of suspension contained 1.2 millimoles of titanium compound.

II. Polymerization of ethylene

100 Liters of Diesel oil boiling at a temperature in the range of from 140° to 200° C were introduced into a 150 liter vessel and the air in the vessel was replaced by pure nitrogen. The Diesel oil was then heated at 80–85° C and a solution of 54 grams (400 millimoles) of aluminum-triethyl in 500 milliliters of Diesel oil and 80 milliliters of the catalyst suspension were added. The polymerization was carried out at 85° C. 6 Kilograms of ethylene were introduced together with hydrogen in an amount such that the gaseous phase contained 30 % by volume thereof. During the course of polymerization the pressure rose to about 7 atmospheres. After 7 hours the polyethylene formed was separated from the dispersion medium by filtration and dried. 42 Kilograms of polyethylene having a reduced specific viscosity of 1.9, determined with a 0.1 % solution in decahydronaphthalene at 135° C were obtained. About 3.9 kilograms of polymer were obtained per gram of magnesium oxychloride cement. The polyethylene had a very narrow molecular weight distribution (Mw/Mn = 3.6), excellent color and corrosion properties and good properties for injection moulding.

EXAMPLE 7

Copolymerization of ethylene/butene

100 Liters of Diesel oil having a boiling point in the range of from 140° to 200° C were introduced into a 150 liter vessel, the air in the vessel was replaced by pure nitrogen and the Diesel oil was heated at 80° to 85° C. A solution of 79.2 grams (400 millimoles) of aluminum-triisobutyl in 500 milliliters of Diesel oil and 70 milliliters of the catalyst suspension obtained as described in Example 6 were added. The polymerization was carried out at a temperature of 85° C. 6 Kilograms of ethylene and 180 grams of butene-(1) were introduced per hour together with hydrogen in an amount such that the gaseous phase contained 20 % by volume thereof. During the course of polymerization the pressure rose to about 7 atmospheres. After 7 hours the ethylene/butene copolymer was separated from the dispersion medium by filtration and dried. About 43 kilograms of copolymer were obtained having a reduced specific viscosity of 2.6, determined with a 0.1 % solution in decahydronaphthalene at 135° C, and a density of 0.932 g/cc. The product had excellent color and corrosion values. About 4.6 kilograms of copolymer were obtained per gram of magnesium oxychloride cement.

EXAMPLE 8 a. Reaction of the catalyst with ethyl-aluminum sesquichloride

With the exclusion of air and moisture a solution of 50 millimoles of $Al_2(C_2H_5)_3Cl_3$ (12.4 grams) in 250 milliliters of Diesel oil was dropped at 0° C over a period of 2 hours to 100 milliliters of the catalyst suspension obtained as described in Example 6, and the mixture was stirred for a further 2 hours at 20° C. A bluish black precipitate was formed which was washed 4 times, each time with 300 milliliters of Diesel oil. The volume of the suspension was made up to 100 milliliters.

b. Polymerization of ethylene/propylene

100 Liters of Diesel oil boiling at a temperature in the range of from 140° to 200° C were introduced into a vessel having a capacity of 150 liters, the air in the vessel was replaced by pure nitrogen and the Diesel oil was heated at 80° to 85° C. A solution of 54 grams (400 millimoles) of aluminum-triethyl in 500 milliliters of Diesel oil and 40 milliliters of the suspension of the reduced catalyst were added. The polymerization was carried out at 85° C. 6 Kilograms of ethylene and 150 grams of propylene were introduced together with hydrogen in an amount such that the gaseous phase contained 20 % by volume thereof. During the course of polymerization the pressure rose to about 7 atmospheres. After 7 hours the polymer formed was separated from the dispersion medium by filtration and dried. About 43 kilograms of an ethylene/propylene copolymer having a reduced specific viscosity of 3.4, determined with a 0.1 % solution in decahydronaphthalene at 135°

C, and a density of 0.936 g/cc were obtained. The polymer had excellent color and corrosion values.

EXAMPLE 9

A horizontal reactor having a capacity of 10 liters, provided with stirrer the stirring means of which scraped along the inner wall was charged with 500 grams of polyethylene having a reduced specific viscosity of 3.1 and an apparent density of 450 g/l. The reactor was freed from air by repeatedly evacuating and scavenging for several hours with a mixture of ethylene and hydrogen, and heated at 85° C. 5.7 Grams (50 millimoles) of $Al(C_2H_5)_3$ and 6 milliliters of the catalyst suspension of Example 6 were then added.

400 Grams of ethylene were introduced per hour together with hydrogen in such an amount that during polymerization the proportion thereof amounted to 15 % by volume. During the course of polymerization the pressure rose to about 9 atmospheres. After 12 hours about 5.2 kilograms of polyethylene were obtained having a reduced specific viscosity of 3.4, determined with a 0.1 % solution in decahydronaphthalene at 135° C.

What is claimed is:

1. In the process for polymerizing ethylene or a mixture of ethylene with up to 10% by weight of $\alpha$-olefins of the formula R—CH = $CH_2$, in which R is a branched or straight-chain hydrocarbon radical having one to 13 carbon atoms, in solution, in suspension or in the gaseous phase, at a temperature in the range of from 20° to 120° C., under a pressure of up to 20 atmospheres, in the presence of a mixed catalyst comprising the reaction product of a titanium compound and an inorganic solid (component A) and an organo-aluminum compound (component B), the improvement which comprises using as component A of the mixed catalyst the reaction product obtained by reacting $TiCl_2(O-i-C_3H_7)_2$ with a magnesium compound of the formula $MgCl_2.xMg(OH)_2$ in which $x$ is 3 to 10.

2. The process of claim 1 wherein the molecular weight of the resulting polymer is regulated by means of hydrogen.

3. The process according to claim 1 wherein component A is obtained by reacting the components at a temperature of between 0° and 200° C. in the presence of an inert diluent and washing the resulting reaction product to remove unreacted $TiCl_2(O-i-C_3H_7)_2$.

4. The process according to claim 1 wherein component A contains 0.05 to 10 mg-atom titanium per gram of component A.

5. The process according to claim 1 wherein the organo-aluminum compound has the formula $R_2AlCl$ or $R_3Al_2Cl_3$ in which R stands for identical or different alkyl radicals having one to 16 carbon atoms.

6. The process of claim 1, wherein component A is prepared at a temperature of 0° to 200° C.

7. The process of claim 1, wherein the organo-aluminum compound is an aluminum trialkyl of the formula $Al(R)_3$ or a dialkyl aluminum hydride of the formula $Al(R)_2H$ in which R stands for identical or different hydrocarbon radicals having one to 16 carbon atoms.

8. The process of claim 1, wherein propylene, butene-(1) and 4-methylpentene-(1) are used as the $\alpha$-olefin.

* * * * *